(No Model.)
J. W. HAYS.
HARROW.
No. 477,541. Patented June 21, 1892.
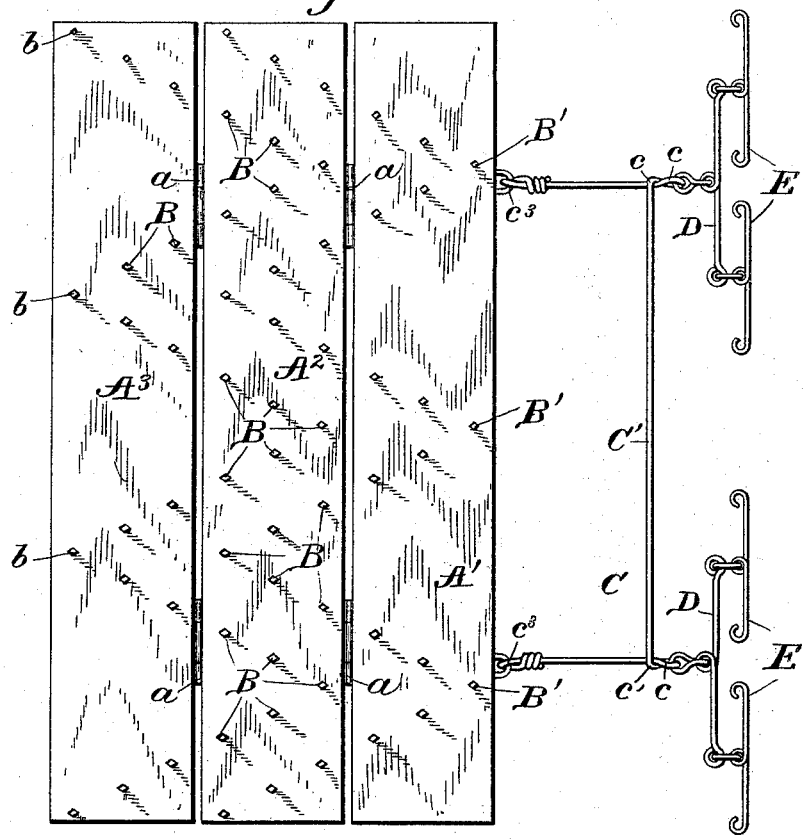
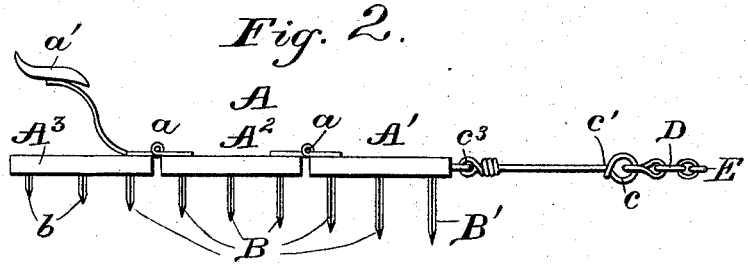
Witnesses;
Riley C. Bowen
J. L. Wilson
Inventor;
John W. Hays.
By Whitman & Wilkinson
Attorneys.

UNITED STATES PATENT OFFICE.

JOHN W. HAYS, OF CLINTON, ILLINOIS.

HARROW.

SPECIFICATION forming part of Letters Patent No. 477,541, dated June 21, 1892.

Application filed December 17, 1891. Serial No. 415,407. (No model.)

*To all whom it may concern:*

Be it known that I, JOHN W. HAYS, a citizen of the United States, residing at Clinton, in the county of DeWitt and State of Illinois, have invented certain new and useful Improvements in Harrows; and I do hereby declare the following to be a full, clear, and exact description of the invention, such as will enable others skilled in the art to which it appertains to make and use the same.

My invention relates to folding harrows and clod-crushers, and has for its object to provide a harrow composed of sections hinged together, so that it will readily adjust itself to inequalities of the ground, and in which the teeth are made longer in front in order to break up the larger clods and to stir the ground to a great depth and grow shorter toward the rear to pulverize and smooth the earth after the larger clods are broken up by the longer teeth.

A further object of my invention is to provide improved means for attaching the horses to the harrow and for keeping them at the proper distance apart. This object and such others as fairly fall within the scope of my invention I attain by means of the mechanism hereinafter described, the specific points of novelty of which will be pointed out in the claim.

Reference is had to the accompanying drawings, wherein the same parts are indicated by the same letters.

Figure 1 represents an inverted plan view of my improved harrow. Fig. 2 represents a side elevation thereof.

A designates the harrow, which is composed of three or more flat pieces of wood or sections $A'$, $A^2$, and $A^3$, hinged together, as at $a$. A seat $a'$ may be placed upon one of the pieces, as $A^3$, if desired.

The teeth B, as will be seen by reference to Fig. 1, are arranged in double parallel rows running zigzag across the harrow and forming angles of approximately sixty degrees, the apexes of the angles being at the teeth $B'$ along the front of the harrow. The said teeth $B'$ at the front of the harrow are made longer than the rest of the teeth to break up the larger clods of earth, while the teeth $b$ at the rear of the harrow are made quite short to pulverize and smooth the ground after it has been broken by the longer teeth in front.

The harrow is made of large size and designed to be drawn by four horses. For this purpose I employ the improved means of attachment for the horses, consisting of a rod C, of iron or other suitable material, which is bent to form the eyes $c\ c$ at about midway between its middle and ends. These eyes are bent at right angles to the center $C'$ of the rod C, the ends being carried over the central piece, as at $c'$, and pivoted to the front board $A'$ of the harrow, as at $c^3$, thus forming a three-sided rectangular frame pivoted to the harrow and having the eyes $c\ c$ at its outer corners, to which eyes the doubletrees D D are connected. The singletrees E E are attached to the ends of the doubletrees in the usual manner. Thus it will be seen that the frame formed of the rod C, while it is free to move vertically, is very rigid laterally and serves to keep the two pairs of horses at the proper distance apart.

By the construction herein shown and described I provide a harrow which is simple in construction, cheap, and durable, and very effective for the purpose designed.

It will be understood that I do not wish to limit myself to the precise details of construction as hereinbefore described, as slight modifications may be made therein without departing from the spirit of my invention.

Having thus described my invention, what I claim, and desire to secure by Letters Patent of the United States, is—

A harrow having the boards $A'$, $A^2$, and $A^3$, hinged together, the teeth arranged in zigzag rows forming angles at the front of the harrow, said teeth being longer in front than in the rear, and the frame formed of the rod C pivoted to the front board of the harrow, with the eyes $c\ c$ upon the said frame and the doubletrees connected to the said eyes, substantially as described.

In testimony whereof I affix my signature in presence of two witnesses.

JOHN W. HAYS.

Witnesses:
JAMES M. NORTH,
J. H. SAVELEY.